(12) United States Patent
Cunningham et al.

(10) Patent No.: US 7,086,509 B2
(45) Date of Patent: Aug. 8, 2006

(54) VIBRATION ISOLATOR WITH ADJUSTABLE RESPONSE

(76) Inventors: John Cunningham, 35 Loughberry Rd., Saratoga Springs, NY (US) 12866; Robert E. Roemer, 185 Main St., Bolton, MA (US) 01740

( * ) Notice: Subject to any disclaimer, the term of this patent is extended or adjusted under 35 U.S.C. 154(b) by 0 days.

(21) Appl. No.: 10/097,454

(22) Filed: Mar. 14, 2002

(65) Prior Publication Data

US 2002/0157911 A1      Oct. 31, 2002

Related U.S. Application Data

(60) Provisional application No. 60/275,649, filed on Mar. 14, 2001.

(51) Int. Cl.
*F16F 7/10* (2006.01)
(52) U.S. Cl. .................. 188/378; 267/136; 267/140.11
(58) Field of Classification Search ................ 188/378, 188/379; 267/136, 140.11, 140.2, 140.5, 267/141; 248/560, 562, 580, 602, 636
See application file for complete search history.

(56) References Cited

U.S. PATENT DOCUMENTS

| | | | | |
|---|---|---|---|---|
| 1,072,526 A | | 9/1913 | Stiles | 248/628 |
| 4,699,257 A | * | 10/1987 | Lloyd | 188/380 |
| 4,946,128 A | | 8/1990 | Cunningham | 248/560 |
| 5,205,528 A | | 4/1993 | Cunningham | 248/602 |
| 5,590,506 A | | 1/1997 | Cunningham | 52/741.3 |
| 5,788,182 A | * | 8/1998 | Guimbal | 244/17.27 |
| 5,904,345 A | * | 5/1999 | Matsubayashi et al. | 267/152 |
| 6,029,959 A | * | 2/2000 | Gran et al. | 267/136 |
| 6,059,274 A | * | 5/2000 | Owen et al. | 267/136 |
| 6,220,563 B1 | | 4/2001 | Cunningham | 248/580 |

FOREIGN PATENT DOCUMENTS

| | | | | |
|---|---|---|---|---|
| JP | | 60143239 A | * | 7/1985 |
| WO | | WO 97/00403 | * | 1/1997 |

* cited by examiner

*Primary Examiner*—James McClellan
*Assistant Examiner*—Bradley T. King
(74) *Attorney, Agent, or Firm*—Porter Wright Morris & Arthur LLP

(57) ABSTRACT

A vibration isolator with an adjustable response. A vibration isolator for isolating a vibration source from a support structure include a base in engagement with the support structure and two supports connected to the base. At least one of the supports is slidably connected to the base. A flexible member having a generally elongate shape and an elongate length is supported by the two supports. The flexible member is attachable to the vibration source. Each support slidably engages the flexible member such that the flexible member can move relative to each support with the support that is slidably connected to the base being moveable along the elongate length of the flexible member.

20 Claims, 16 Drawing Sheets

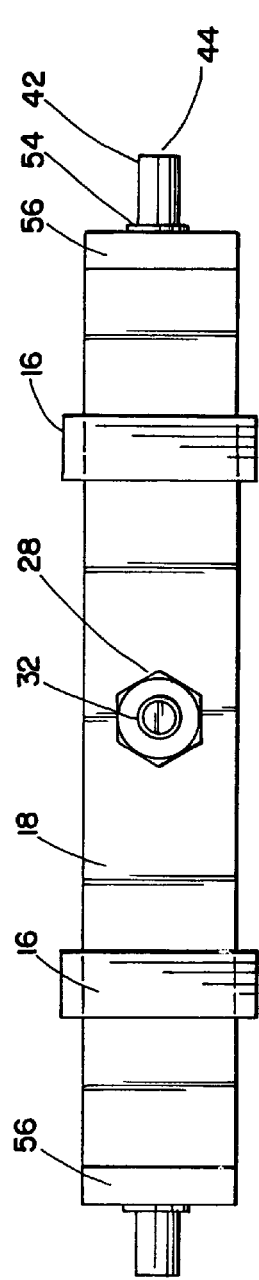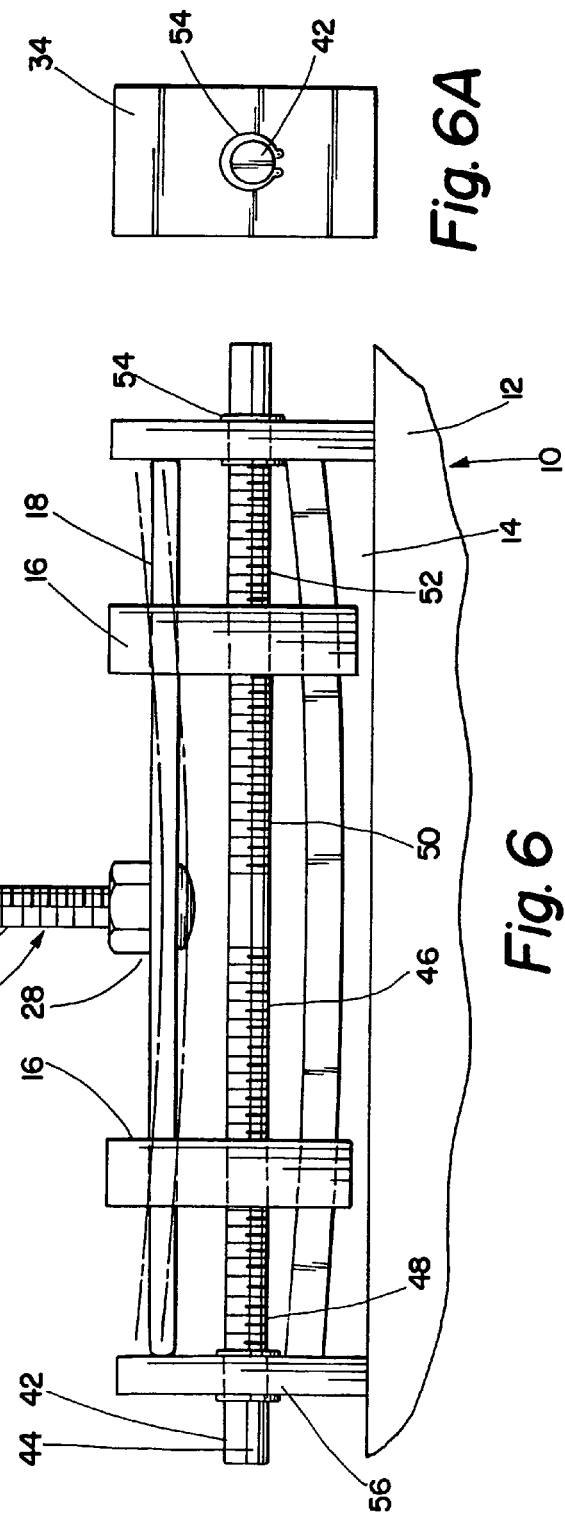

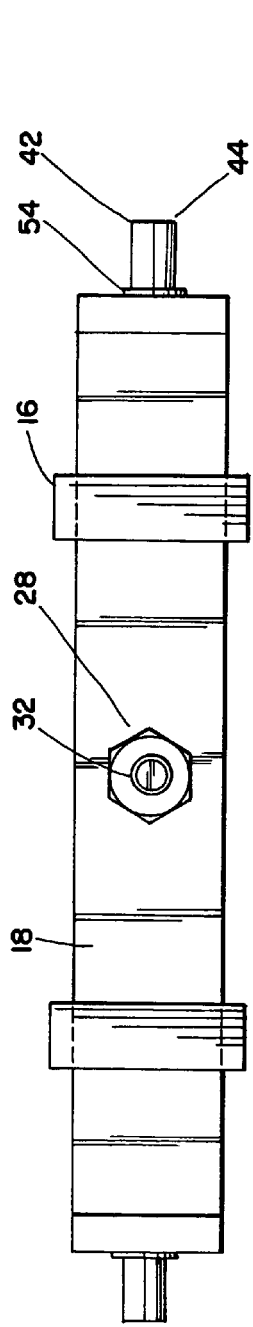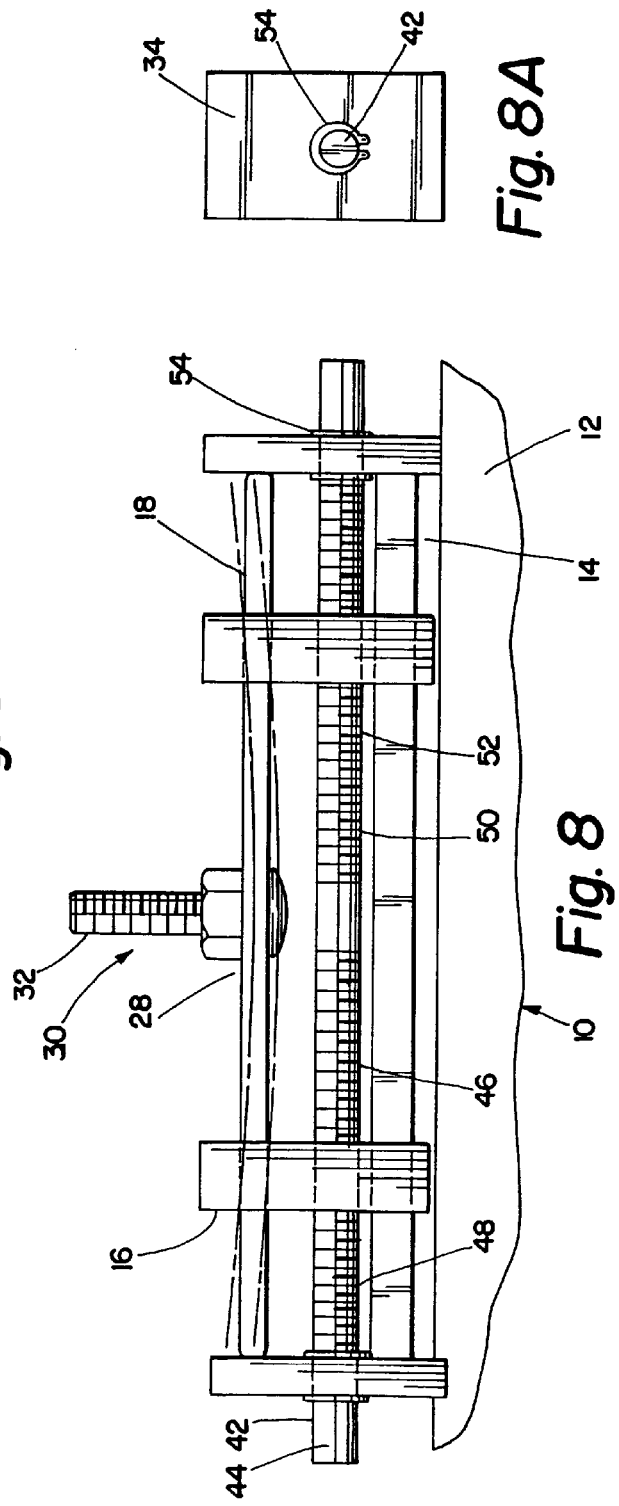

VIBRATION ISOLATOR WITH ADJUSTABLE RESPONSE

RELATED APPLICATION

This application claims the benefit of U.S. provisional patent application No. 60/275,649, filed Mar. 14, 2001.

FIELD OF THE INVENTION

The present invention generally relates to a vibration isolator and more particularly to a vibration isolator with an adjustable response.

BACKGROUND OF THE INVENTION

Vibration isolators may be designed to isolate vibration produced by a vibrating element supported on a support structure from a substrate or to isolate an element (such as a work surface or enclosure) supported on a support structure from a vibrating substrate. Conventional vibration isolation structures for both these applications generally have fixed isolation characteristics and are designed to isolate vibration optimally at the predominant or average excitation frequency occurring in the system. However, most systems experience variations in excitation frequency of the vibration source and variations in structural characteristics that affect the stiffness, mass, or mass distribution in the system. Changes in the excitation frequency of a system may occur, for example, due to speed changes in process pump/motor sets operating on variable frequency drives or speed changes in marine propulsion units to accommodate schedule and sea conditions. Changes in structural characteristics of a system may occur, for example, due to changes in a tank level, piping, or ship cargo mass and distribution.

Vibration isolators with fixed isolation characteristics have proven to be a significant problem in applications in which minimum structural or acoustic vibration is important, such as, for example, high tech fabrication facilities, marine propulsion systems, and refrigeration units near customers in retail food sales/service. Vibration isolators with fixed isolation characteristics generally are designed to have optimal transmissibility (i.e., the ratio of the amplitude of the force transmitted to the support structure to the amplitude of the exciting force of the vibration source) at the predominant or average excitation frequency occurring in the system. The transmissibility of a vibration isolator with fixed isolation characteristics varies with respect to the excitation frequency of the vibration source. Therefore, even slow variations in semi-steady state excitation frequency or structural characteristics result in unacceptable excitation of the system when using an isolator with fixed isolation characteristics.

Accordingly, there is a need in the art for a vibration isolator with an adjustable response that provides optimal vibration isolation despite changes in excitation frequency of the vibration source or changes in the structural characteristics of the support structure. Preferably, such vibration isolators are useful both for isolating a vibration source from a substrate and for isolating a work surface from a vibrating substrate.

SUMMARY OF THE INVENTION

The present invention provides a vibration isolator with an adjustable response that overcomes at least some of the above-noted problems of the related art. According to one embodiment of the present invention, a vibration isolator for use in a system with a vibration source and a support structure for the vibration source is provided that comprises a base in engagement with the support structure, two supports connected to the base, and a flexible member supported by the two supports. At least one of the supports is slidably connected to the base. Most preferably, both supports are slidably connected to the base.

The flexible member is attachable to the vibration source and has a generally elongate shape and an elongate length. Each support slidably engages to the flexible member such that the flexible member can move relative to each support with the support that is slidably connected to the base being moveable along the elongate length of the flexible member.

The vibration isolator preferably further comprises means for moving the supports along the elongate length of the flexible member. In one preferred embodiment of the invention, the means for moving the supports is automated to respond to vibration occurring in the system in order to optimize the vibration isolation of the vibration isolator.

In another preferred embodiment of the invention, the means for moving the supports comprises a shaft operatively connected to the supports and positioned along a rotational axis about which the shaft is rotatable. The shaft has a set of first threads on a first half of the shaft and a second set of threads on a second half of the shaft. The first set of threads mate with corresponding threads on one of the supports and the second set of threads mate with corresponding threads on the other of the supports. The first set of threads is oriented in a first direction and the second set of threads is oriented in an opposite direction such that the supports move in opposite directions at equal rates when the shaft is rotated about the rotational axis. Alternatively, the means for moving the supports may be selected from a piezoelectric actuator system, a hydraulic system, a rack and pinion system, a cam bearing system, a mechanical linkage system, and a cable system.

In yet another preferred embodiment of the present invention, the flexible member is attachable to a vibration source at an attachment position centrally located along the elongate length of the member. The supports are positioned on opposite sides of the attachment position of the flexible member at substantially equal distances from the attachment position. The supports are concurrently movable in opposite directions along the support such that the supports remain at substantially equal distances from the attachment position of the flexible member when the supports are moved. The path of the supports along the base is curved such that the height of the supports is increased as the supports are moved away from the attachment position.

In another embodiment of the present invention, a vibration isolator for use in a system with an isolated surface and a vibrating substrate is provided that comprises a base in communication with the vibrating substrate, two supports slidably connected to the base, a flexible member supported by the two supports, and a surface attached to the flexible member. The flexible member has a generally elongate shape and an elongate length. Each support slidably engages the flexible member such that each support is movable along the elongate length of the flexible member.

The invention also include a vibration isolator for use in a system with an isolated surface and a vibrating substrate. The vibration isolator comprises a base in communication with the vibrating substrate, two supports connected to the base, a flexible member supported by the two supports, and a surface attached to the flexible member. At least one of the supports is slidably connected to the base. The flexible member has a generally elongate shape and an elongate length including a midportion and opposing ends and is supported by the two supports at a distance spaced from the corresponding ends of the flexible member. The surface is connected to the flexible member intermediate the ends of the flexible member and between the two supports.

The flexible member is capable of bending from an original position to assume a more or less bowed position in response to changes in a load applied to the surface. The flexible member and the supports cooperate to allow oscillation of the flexible member at a predetermined frequency in response to vibration transmitted from the substrate through the supports. The sliding movement of one of the supports relative to the other support alters the predetermined frequency at which the flexible elastic member responds to the transmitted vibration.

From the foregoing disclosure and the following more detailed description of various preferred embodiments it will be apparent to those skilled in the art that the present invention provides a significant advance in the technology and art of vibration isolators. Particularly significant in this regard is the potential the invention affords for providing a vibration isolator that provides optimal vibration isolation despite changes in excitation frequency of the vibration source or changes in the structural characteristics of the support structure. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 6 is a side view of a vibration isolator according to another embodiment of the present invention shown with a curved base and shown with the shaft connected to both end stops;

FIG. 6A is an end view of the vibration isolator of FIG. 6;

FIG. 7 is a top view of a the vibration isolator of FIG. 6;

FIG. 8 is a side view of a vibration isolator according to yet another embodiment of the present invention shown with a flat base and shown with the shaft connected to both end stops;

FIG. 8A is an end view of the vibration isolator of FIG. 8;

FIG. 9 is a top view of the vibration isolator of FIG. 8;

Figure 1:
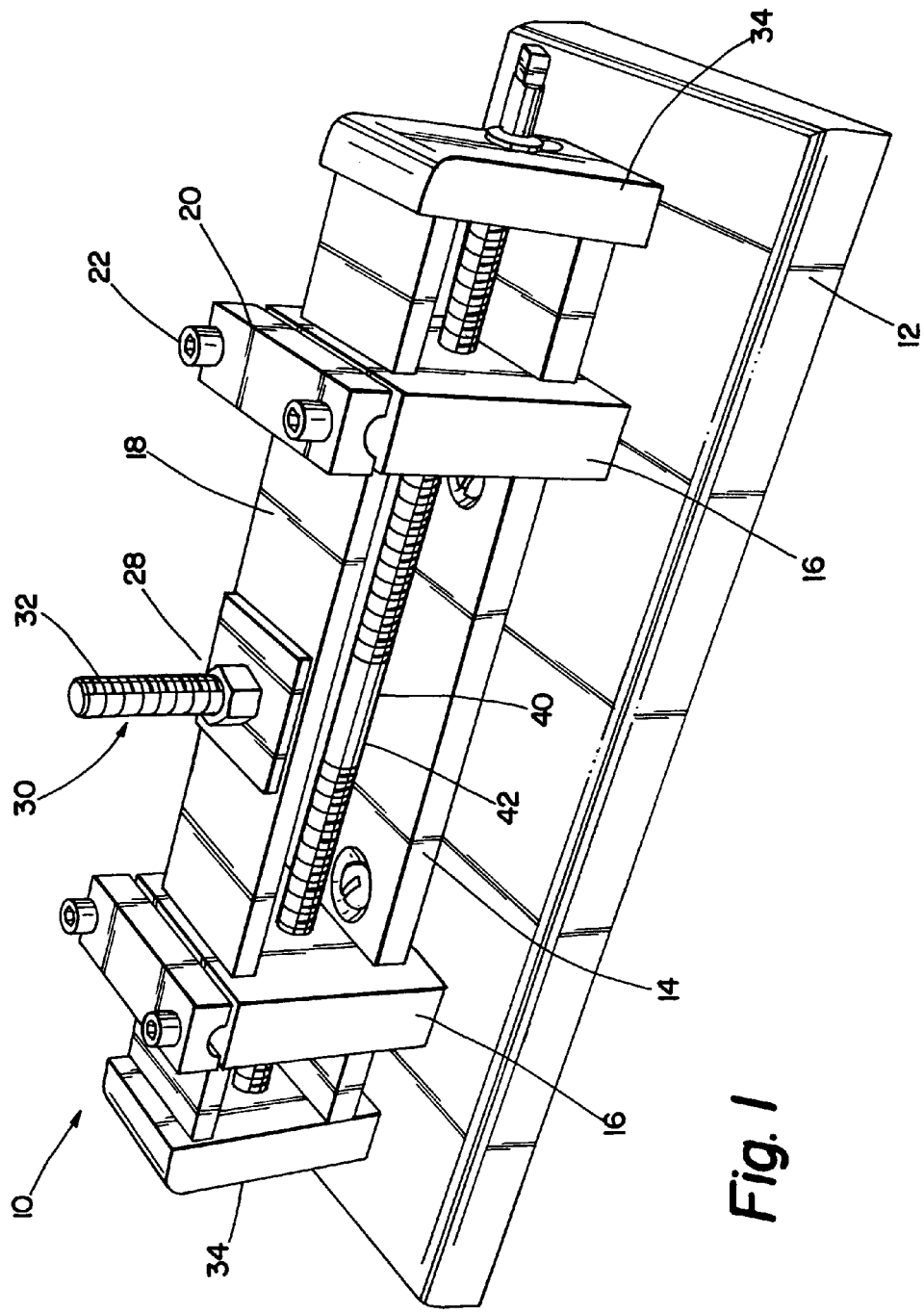
FIG. 1 is a perspective view of a vibration isolator according to one preferred embodiment of the present invention shown with a curved base and shown with the shaft connected to only one end stop.
Figure 2:
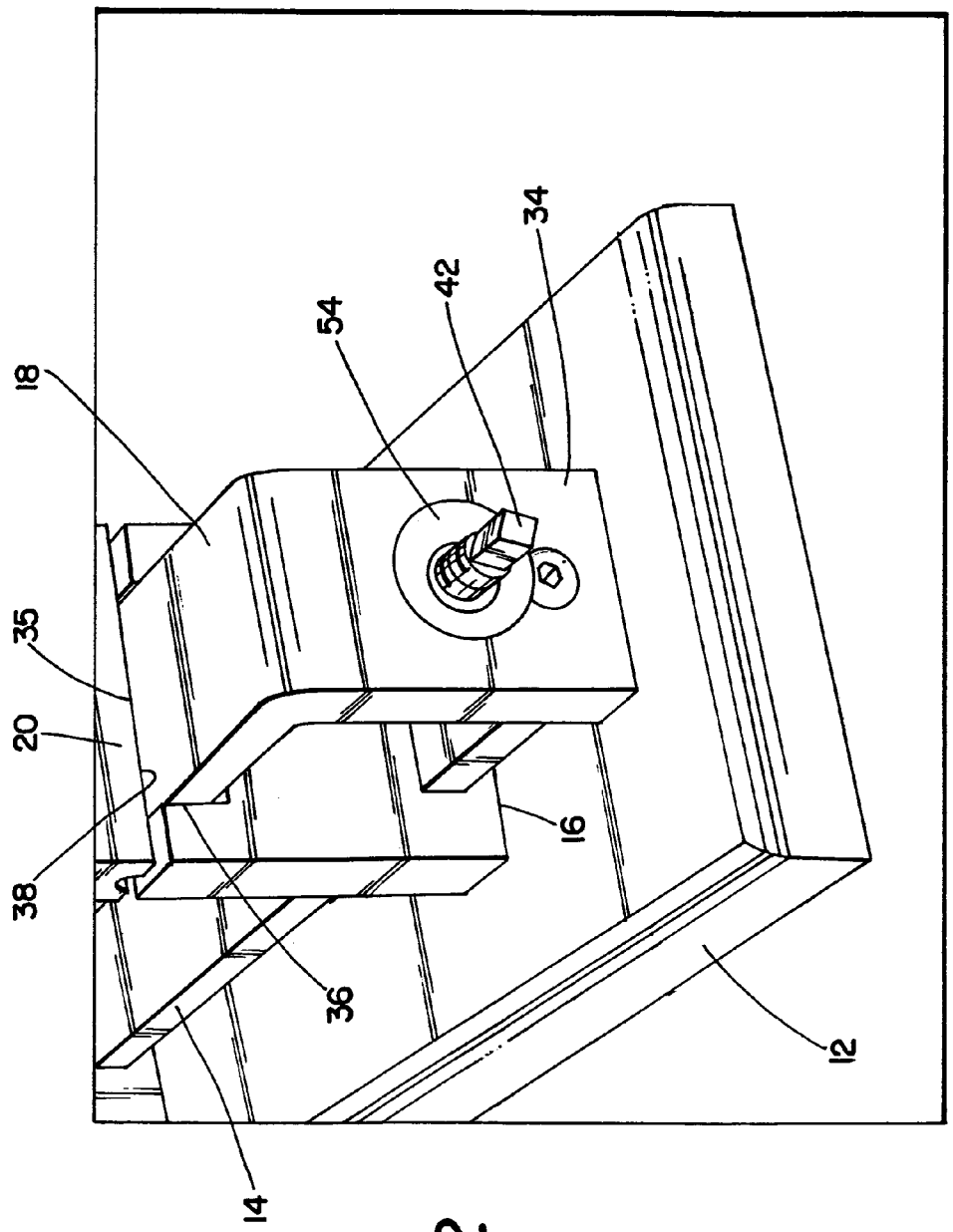
FIG. 2 is an end perspective view of a portion of the vibration isolator of FIG. 1.

It should be understood that the appended drawings are not necessarily to scale, presenting a somewhat simplified representation of various features illustrative of the basic principles of the invention.

It will be apparent to those skilled in the art, that is, to those who have knowledge or experience in this area of technology, that many uses and design variations are possible for the vibration isolator with an adjustable response disclosed herein. The following detailed discussion of various alternative and preferred embodiments will illustrate the general principles of the invention with reference to a vibration isolator for a motor or engine. Other embodiments suitable for other applications will be readily apparent to those skilled in the art given the benefit of this disclosure.

Referring now to the drawings, FIGS. 1–12 illustrate preferred and alternative embodiments of a vibration isolator 10 according to the present invention for use in a system having a source of vibration (such as, for example, a motor, engine, or pump) (not shown) and a support structure 12 for the source of vibration (such as, for example, an engine support structure). In some applications, such as in a marine vessel, the support structure 12 may have changing characteristics (such as, for example, stiffness, mass, or mass distribution) and may receive vibrations from an outside source (such as, for example, waves) other than the vibration source. The vibration isolator 10 isolates vibration occurring in the vibration source from being completely transmitted to the support structure 12 and isolates vibration occurring in the support structure 12 from being completely transmitted to the vibration source.

In a highly advantageous feature more fully discussed below, the transmissibility of the vibration isolator 10 may be varied with respect to the excitation frequency of the vibration source or the support structure 12 so that the vibration isolator 10 can maintain optimal vibration isolation as the vibration frequency occurring in the system changes.

While the illustrated embodiments of the vibration isolator 10 of the present invention are particularly adapted for use with an engine of a motor vehicle such as a marine vessel, it is noted that principles of the invention are applicable to other systems with sources of vibration such as, for example, heating, ventilation, and air conditioning (HVAC) equipment, refrigeration systems, and variable frequency drive (VFD) motors.

The vibration isolator 10 comprises a base 14, two supports 16, and a flexible member 18 supported by the two supports 16. The base 14 is in engagement with, and preferably attachable to, a support structure 12. The flexible member 18 is preferably attachable to a vibration source. The two independent supports 16 are connected to the base 14 and slidably engage the flexible member 18. Preferably, both supports 16 are slidably connected to the base 14 as shown in FIGS. 1–5, although satisfactory results may be achieved if at least one of the supports 16 is slidably connected. The flexible member 18 preferably has a generally elongate shape and an elongate length. The support or supports 16 that is slidably connected to the base 14 may travel along the elongate length of the flexible member 18. The base 14 and the supports 16 are preferably formed from a metal or metal alloy, but may be formed from any other suitable material such as, for example, a composite material.

FIGS. 1–5 illustrate a first preferred embodiment of the invention. As illustrated in the drawings, each support 16 includes a removable cap 20 that is attached to the support 16 using connectors such as screws 22. The height of the cap 20 is adjustable to allow for flexible members 18 of variable thickness and to allow for removal of the flexible member 18 without disassembling the entire vibration isolator 10. Each support 16 preferably includes two contact pieces 24 (FIGS. 4 and 5) that reduce friction between the supports 16 and the flexible member 18 when the supports 16 and flexible member 18 move relative to each other. In the preferred embodiment, each of the contact pieces 24 has a curved face 26 (FIGS. 4 and 5) that permits the flexible member 18 to bend and move through the supports 16 without binding to the supports 16. However, other friction reducing means such as, for example, ball or roller bearings, may be used as contact pieces 24 to facilitate movement between the supports 16 and the flexible member 18. Using the contact pieces 24 allows the support 16 to be made from a different material than the contact pieces 24. This feature ensures that the material of the flexible member 18 will properly slide in the supports 16, as it may be advantageous in some embodiments to have the supports 16 made from a material that is not slidably compatible with the material of the flexible member 18.

Figure 3:
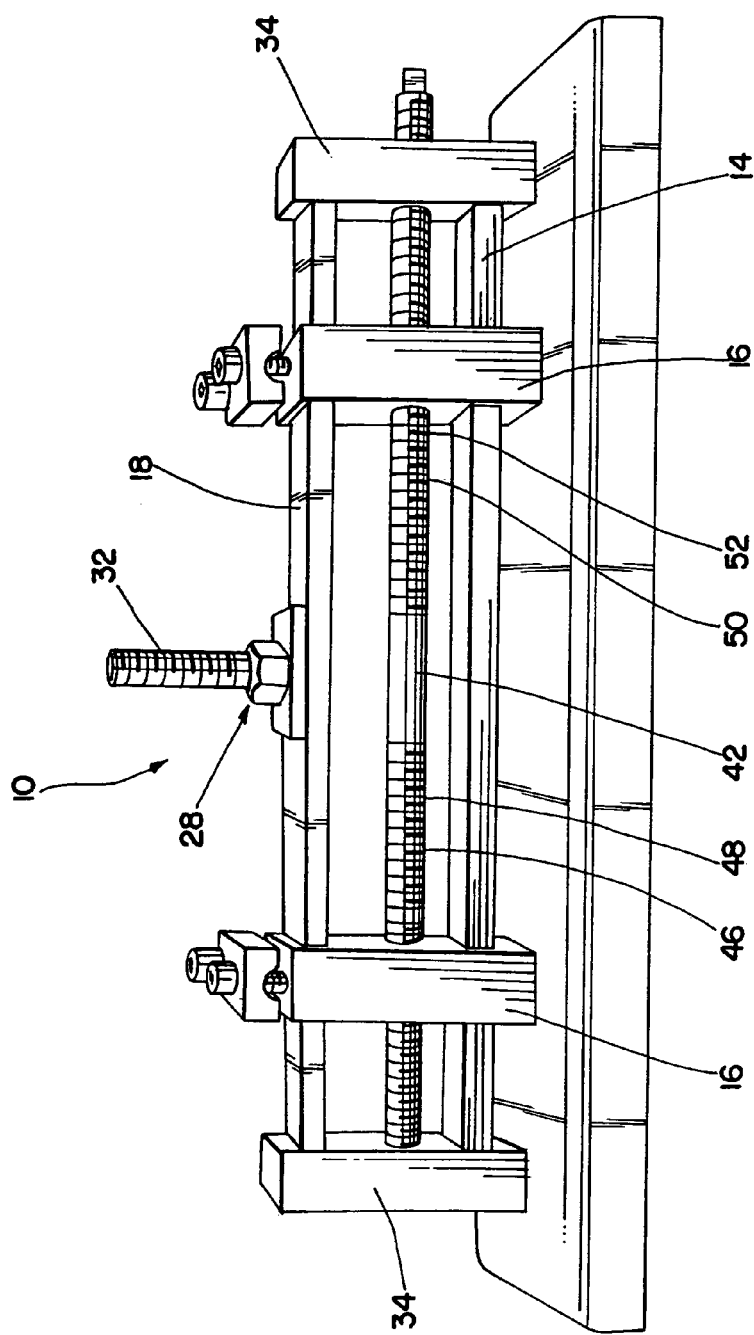
FIG. 3 is a side perspective view of the vibration isolator of FIG. 1.
Figure 4:
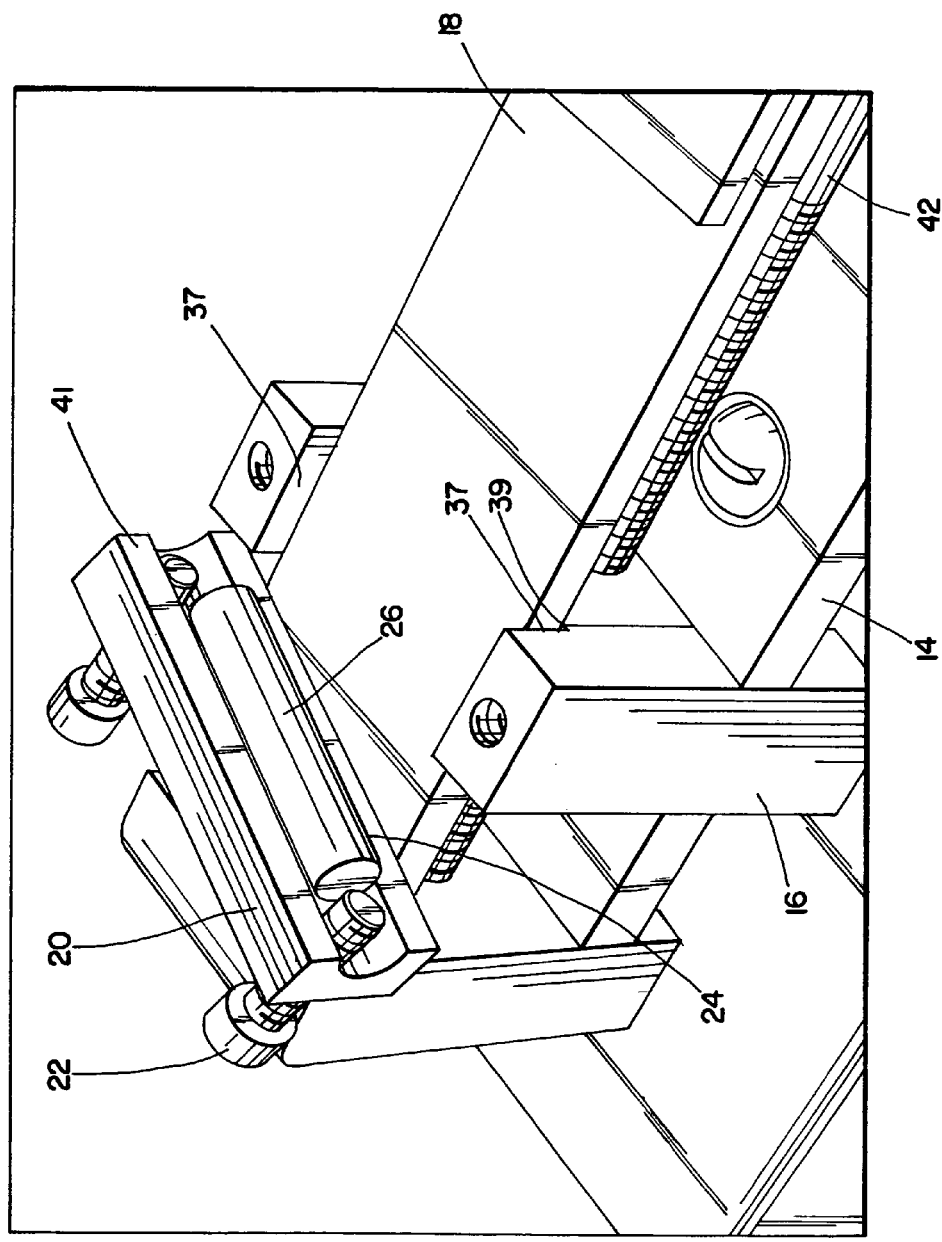
FIG. 4 is a perspective view of a portion of the vibration isolator of FIG. 1 shown in a partially assembled state with the cap of one support removed.
Figure 5:
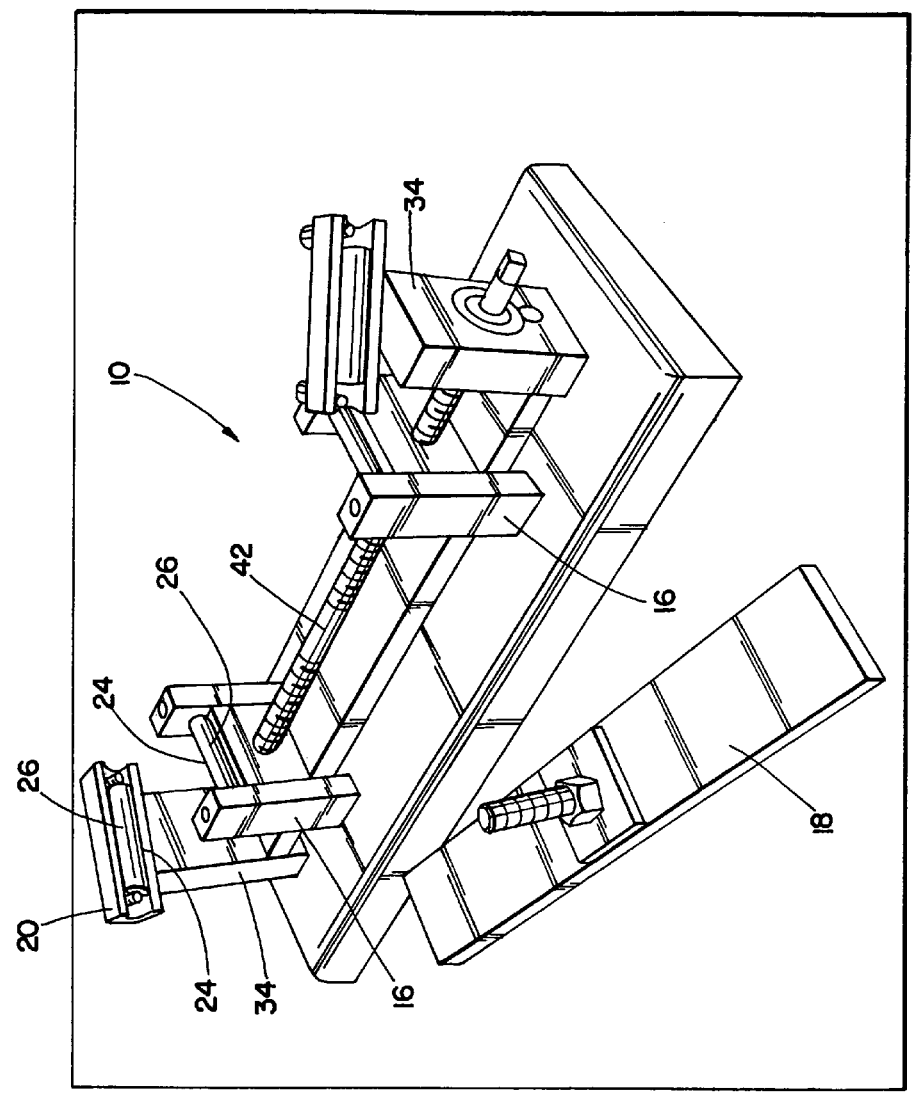
FIG. 5 is a perspective view of the vibration isolator of FIG. 1 shown in a partially assembled state with the caps of the supports removed and the flexible member removed from the supports.

The flexible member 18 is attachable to the vibration source at an attachment position 28 of the flexible member 18. In the preferred embodiment and as illustrated in FIGS. 1 and 3, the attachment position 28 is centrally located along the elongate length of the flexible member 18 and centrally located along a lateral width of the flexible member 18. The flexible member 18 includes an attachment member 30, such as, for example, a threaded rod 32, to attach the vibration source to the vibration isolator 10 at the attachment position 28. As best illustrated in FIG. 3, the supports 16 are positioned on opposite sides of the attachment position 28 (and the attachment member 30) at substantially equal distances from the attachment position 28. Although the attachment position 28 extends upwardly from the flexible member 18 in the preferred embodiment illustrated in FIGS. 1 and 3, the attachment position 28 also may be oriented in other directions relative to the flexible member.

In the first preferred embodiment, the shape of the flexible member 18 (i.e., a beam with a narrow height) is designed to allow for flexibility in only vertical directions (i.e., upward or downward as viewed in FIG. 3). In alternative embodiments of the invention, other shapes of the flexible member 18 allow for flexibility in more directions than only vertical directions. For example, a flexible member 18 with a circular cross section would be flexible in vertical directions (i.e., upward or downward in FIG. 3) and lateral directions (i.e., inward or outward of the plane of the paper in FIG. 3) as well as in all directions in between those vertical and lateral directions. In the first preferred embodiment of the invention, the flexible member 18 defines a first longitudinal axis when the member 18 is in a rest position (FIG. 3). However, those skilled in the art given the benefit of this disclosure will recognize that in some embodiments of the present invention the shape of the flexible member 18 may not define a linear longitudinal axis when the member 18 is in a rest position. For example, the flexible member 18 will not define a linear longitudinal axis in a rest position if the member 18 is curved in a rest position.

Figure 11:
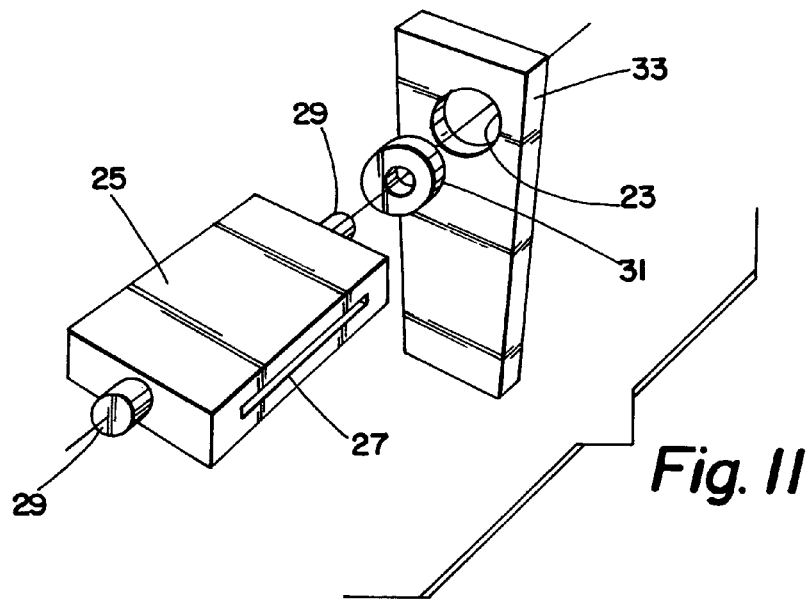
FIG. 11 is an exploded perspective view of a portion of an alternative embodiment of a support of a vibration isolator in accordance with the present invention.

When the flexible member 18 bends at the attachment position 28, the flexible member 18 moves through the supports 16 and also bends at each support 16. The bending of the flexible member at each support 16 could potentially lead to two problems: (1) the flexible member 18 may place a force on the supports 16 when the flexible member 18 is bent such that movement of the flexible member 18 in the supports 16 is constrained (e.g., if the cap 20 is adjusted to a tight enough position); and (2) the flexible member 18 may cause a potentially damaging impact between the flexible member 18 and the supports 16 when the flexible member 18 is bent or unbent (e.g., if the cap 20 is adjusted so that there is a gap between the flexible member 18 and the supports 16). One way to avoid these potential problems is to include an elastic mechanism on the contact pieces 24 (such as, for example, an elastomeric material backed on the contact pieces 24 or a spring mechanism attached to the contact pieces 24). Such an elastic mechanism allows the caps 20 of the supports 16 to be adjusted to a position where the flexible member 18 is in contact with the contact pieces 24 of both supports 16 when the flexible member is in an unbent, horizontal position, and allows the flexible member 18 to bend under a load without placing an extra force on the support 16 that would constrain movement of the flexible member 18 in the supports 16. FIG. 11 illustrates another way to avoid the two potential problems listed above. FIG. 11 shows an exploded perspective view of a portion of an alternative embodiment of a support 16A. The alternative support 16A includes a rotatable cross member 25 having a slot 27 for the flexible member 18. The cross member 25 is rotatably attached by trunnions 29 on each side of the cross member 25 to bearings 31 inserted in openings 23 on each side 33 of the support 16A. The alternative supports 16A allow the flexible member 18 to freely rotate in the supports 16A when the flexible member 18 bends so that movement of the flexible member 18 through the supports 16A is not affected. The alternative supports 16A also eliminate any need to leave an extra space between the flexible member 18 and the supports 16A that may lead to a potentially damaging impact between the flexible member 18 and the supports 16A.

The flexible member 18 has an active length that is defined by the distance between the two supports 16. The stiffness or flexibility of the flexible member 18 varies with the active length of the flexible member 18. The flexible member 18 becomes stiffer the closer the supports 16 are positioned to each other and becomes more flexible the farther away from each other the supports 16 are positioned. As discussed more fully below, the vibration isolation characteristics and transmissibility of the isolator 10 are changed by varying the stiffness of the flexible member 18.

The flexible member 18 is preferably formed from a material that is flexible, resilient, and durable so that the member 18 will not break when a vibration-producing load is placed on the member 18 for long periods of time. In a preferred embodiment of the invention, the flexible member 18 is formed from pultruded fiberglass.

The vibration isolator 10 preferably includes end stops 34, vertical stops 35 (FIG. 2), and lateral stops 36 (FIG. 2) to limit or prevent the movement of the flexible member 18 in certain directions. The two end stops 34 are attached to the base 14 so that a portion of each end stop 34 is adjacent each end of the flexible member 18 to limit movement of the flexible member 18 in horizontal directions (i.e., leftward or rightward in FIG. 3). The end stops 34 may be formed from a flexible material or may include an elastic mechanism (such as, for example, a spring or an elastomeric backing such as foam or rubber) to prevent the flexible member 18 from chattering against the end stops 34 in the event the flexible member 18 is forced against one of the end stops 34. An inner top wall 41 (FIG. 4), an inner bottom wall 39 (FIG. 4), and inner side walls 37 (FIG. 4) of the supports 16 define holes or recesses 38 (FIG. 2) that slidably accept the flexible member 18. The inner side walls 37 act as lateral stops 36 to limit or prevent movement of the flexible member 18 in the recesses 38 in lateral directions (i.e., inward or outward in the plane of the paper in FIG. 3). The inner side walls 37 may also have contact pieces (not shown) similar to contact pieces 24 in order to minimize friction between the flexible member 18 and the side walls 37. The inner bottom 39 and top 41 walls, along with the contact pieces 24, act as vertical stops 35 to limit or prevent movement of the flexible member 18 in the recesses 38 in vertical directions (i.e., upward or downward in FIG. 3).

Figure 18:
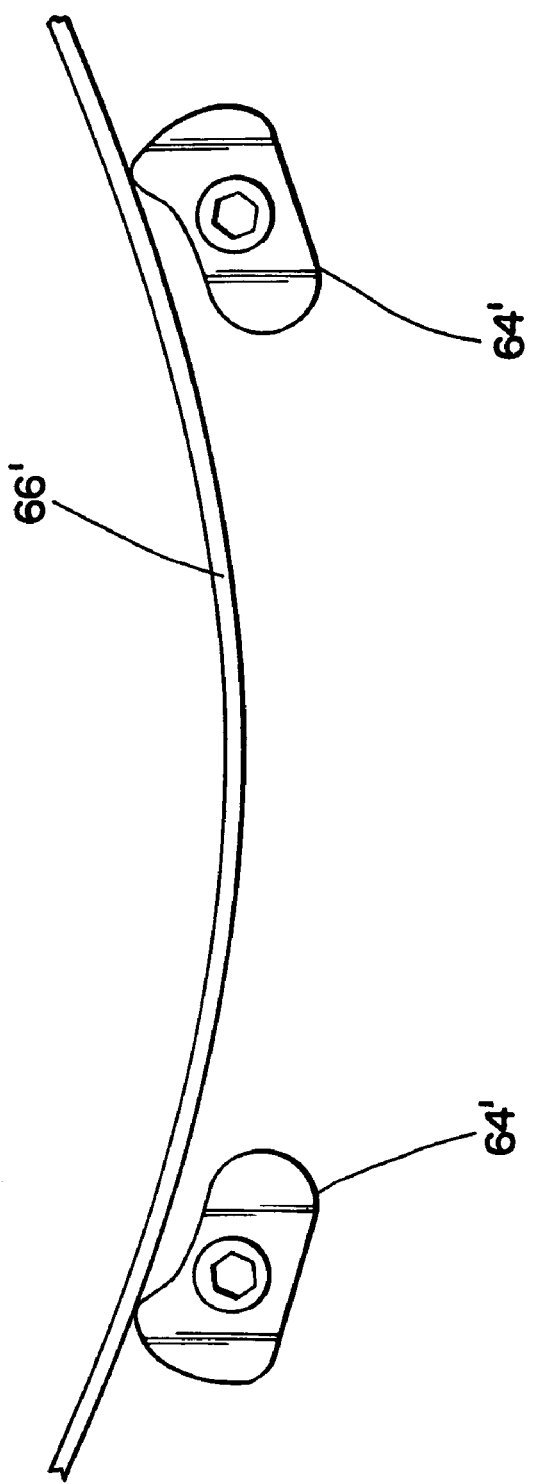
FIG. 18 is a partial diagrammatic view of an alternate cam bearing support for the flexible element.

The vibration isolator 10 preferably includes means 40 for moving the supports 16 along the elongate length of the flexible member 18. In the first preferred embodiment, the means 40 for moving the supports 16 comprises a shaft 42 operatively connected to the supports 16 and positioned along a rotational axis 44 (illustrated in FIGS. 6 and 8 in connection with alternative embodiments of the present invention). The shaft 42 is rotatable about the rotational axis 44, which is preferably substantially parallel to the first longitudinal axis. As best illustrated in FIG. 3, the shaft 42 has a first set of threads 46 on a first half 48 of the shaft 42 and a second set of threads 50 on a second half 52 of the shaft 42. The first set of threads 46 mates with corresponding threads (not shown) on one support 16 and the second set of threads 50 mates with corresponding threads (not shown) on the other support 16. The first set of threads 46 is oriented in a first direction (e.g., left-handed) and the second set of threads 50 is oriented in an opposite direction (e.g., right-handed). The pitch of the first set of threads 46 is preferably equal to the pitch of the second set of threads 50. The shaft 42 is preferably maintained in a stationary position with respect to the base 14. In the first preferred embodiment, the shaft 42 is maintained in a fixed position using one longitudinal stop or circlip 54 (FIG. 2) that is connected to one of the end stops 34. However, as described below in connection with alternative embodiments of the invention, the shaft 42 may be connected to both end stops 34. Other means 40 for moving the supports 16 along the elongate length of the flexible member 18 (such as, for example, a piezoelectric actuator system, a hydraulic system, a system of racks on a common pinion, a cam bearing system, or other mechanical systems such as linkages or cables) are also included in the invention. FIG. 18 shows a symmetrical arrangement of asymmetric cam bearings 64' supporting a flexible rod 66' that allow simultaneous frequency and height adjustment of the flexible rod 66'.

The means 40 for moving the supports 16 along the elongate length of the flexible member 18 preferably concurrently moves the supports 16 in opposite directions along the base 14 to symmetrically increase or decrease the distance of the supports 16 from the attachment position 28 of the flexible member 18. The supports 16 preferably remain at substantially equal distances from the attachment position 28 and attachment member 30 when the supports 16 are moved, thus maintaining equal distribution of the weight of the vibration source (e.g., a motor) on the flexible member 18. In the preferred embodiment, the oppositely oriented sets of threads 46, 50 of the shaft 42 allow the supports 16 to be concurrently movable in opposite directions along the base 14. However, use of other means 40 for moving the supports 16 along the elongate length of the flexible member 18 (such as, for example, a piezoelectric actuator system, a hydraulic system, a system of racks on a common pinion, a cam bearing system, or other mechanical systems such as linkages or cables) would also allow the supports 16 to be concurrently movable in opposite directions along the base 14. In the preferred embodiment, rotation of the shaft 42 may be accomplished, for example, through the use of manual means or electromechanical means. It is also noted that although the supports 16 in the preferred embodiment of the vibration isolator 10 remain at substantially equal distances from the attachment position 28, it may be desirable in some embodiments to have the supports 16 positioned at unequal distances from the attachment position 28 so that there is unequal distribution of the load of the vibration source on the flexible member 18.

FIGS. 6, 6A, and 7 illustrate a second embodiment of the present invention. Parts analogous to those in the first preferred embodiment illustrated in FIGS. 1–5 are indicated by the same reference numerals. Unlike the first preferred embodiment, the second embodiment does not have removable caps 20 on the supports 16. Also, the shaft 42 is connected to both end stops 34 with two circlips 54.

FIGS. 8, 8A, and 9 illustrate another alternative embodiment of the present invention. Parts analogous to those in the first preferred embodiment illustrated in FIGS. 1–5 are indicated by the same reference numerals. As illustrated in FIG. 8, the base 14 is flat rather than curved and the shaft 42 is connected to both end stops 34 with two circlips 54.

Figure 10:
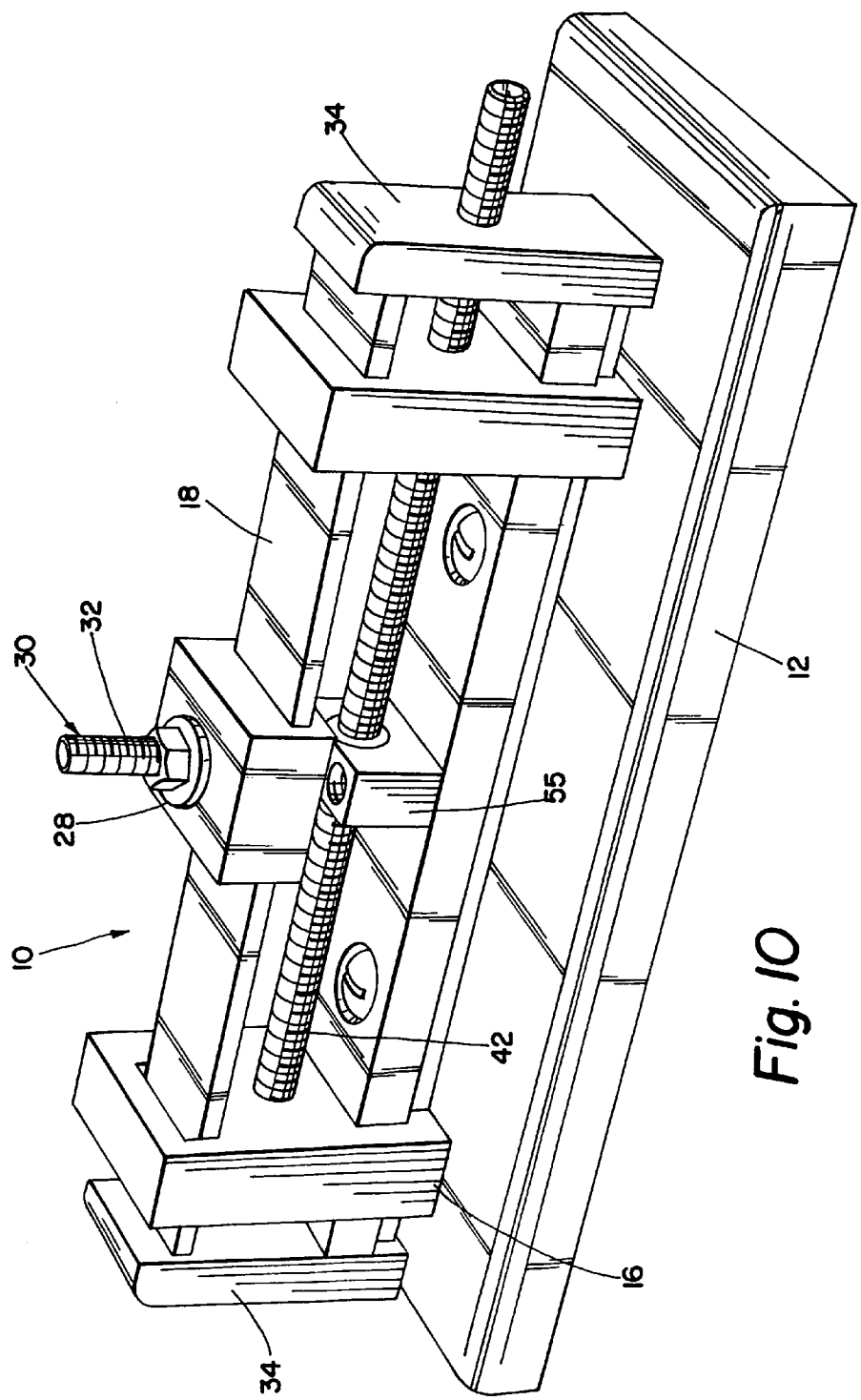
FIG. 10 is a perspective view of a vibration isolator according to yet another embodiment of the present invention shown with a flat base and shown with the shaft connected to one end stop and connected to a middle portion of the base.

FIG. 10 illustrates yet another alternative embodiment of the present invention. Parts analogous to those in the first preferred embodiment illustrated in FIGS. 1–5 are indicated by the same reference numerals. As illustrated in FIG. 10, the base 14 is flat rather than curved. The shaft 42 is connected to one end stop 34 and to a middle portion 55 of the base 14.

Figure 12:
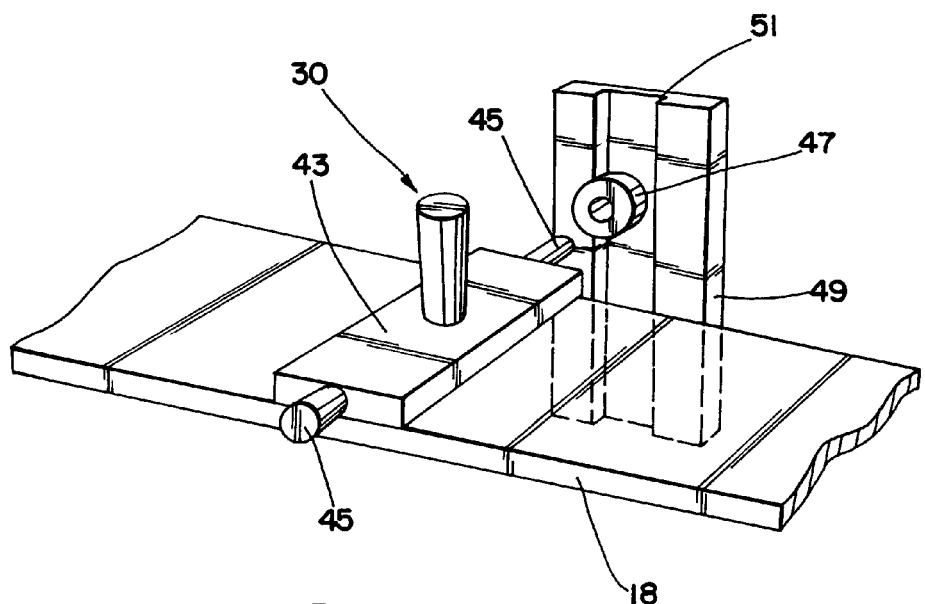
FIG. 12 is an exploded perspective view of a portion of a vibration isolator according to yet another embodiment of the present invention having a flexible member that is constrained from horizontal movement.

FIG. 12 illustrates an exploded perspective view of a portion of yet another alternative embodiment of the present invention wherein the flexible member 18 of the vibration isolator 10 is constrained from horizontal movement along its elongate length. As illustrated in FIG. 12, the alternative embodiment includes a plate 43 attached to the flexible member 18 to which the attachment member 30 and two trunnions 45 are attached. Each trunnion 45 is connected to a ball bearing 47 that is slidably connected to a side support 49 in a vertical channel 51. The side supports 49 are attached to the base 14 of the vibration isolator 10. No end stops 34 are needed in the alternative embodiment because the slidable, rotatable plate 43 ensures that the flexible member 18 is not affected by any horizontal forces from the vibration source.

When the vibration isolator 10 is installed in a system with a vibration source and a supporting structure, the base 14 is preferably firmly mounted to the supporting structure and the attachment member 30 is attached to the vibration source. The vibration isolator 10 preferably accepts at least some of the load of the vibration source. Although the illustrated embodiments are oriented so that the vibration source would be placed directly above the vibration isolator 10 and the isolator 10 would be parallel with a ground plane, the isolator 10 may be positioned in any orientation with respect to the position of the vibration source and ground plane (e.g., above, beside, or below the vibration source). If the load of the vibration source applies a force in a downward direction (as shown in FIGS. 3, 6, and 8) that is strong enough to overcome the stiffness of the flexible member 18, the member 18 will bend. FIGS. 6 and 8 illustrate in phantom the flexible member 18 in a bent position. Vibration produced by the vibration source or the support structure 12 is isolated from the rest of the system by the flexible member 18. It is noted, however, that vibration may not be completely isolated, and some vibration from the vibration source may ultimately be transmitted through the isolator 10 to the support structure 12 and some vibration from the support structure 12 may ultimately be transmitted through the isolator 10 to the vibration source.

As noted above, the transmissibility of the of the vibration isolator 10 may be varied with respect to the excitation frequency of the vibration source (and the excitation frequency of the support structure 12) by changing the stiffness of the flexible member 18 via the adjustable supports 16. The transmissibility of the vibration isolator 10 may be controlled in multiple ways. For example, the transmissibility may be controlled (1) manually by an operator in accordance with a qualitative assessment on the part of the operator that an optimum isolation point has been reached, (2) manually by an operator in accordance with quantitative system vibration data obtained through monitoring equipment attached to the system, or (3) automatically by a computerized control system 102 using monitoring equipment 101 attached to the system to gather and input data into a computer in order to calculate and adjust the isolator 10 to an optimum adjustment, as shown in FIG. 16A. The vibration isolator 10 will have better isolation characteristics and lower transmissibility the more flexible the member 18 becomes. However, as the member 18 becomes more flexible, less support is provided to the vibration source (e.g., motor). Therefore, the vibration isolator 10 will be adjusted to an active length that provides the best isolation while still providing adequate support for the vibration source.

A single vibration isolator 10 or multiple vibration isolators 10 may be attached to the vibration source to isolate vibration in the system. When multiple isolators 10 are used in a system, the isolators 10 may be adjusted simultaneously through the use of mechanical linkages or through the use of coordinated electromechanical devices such as, for example, step motors or selsyns. When a first shaft 42 transfers rotational motion to a second shaft 42 of another isolator 10 via a mechanical linkage (not shown), it is preferable that the first shaft 42 be supported at both end stops 34.

When the vibration isolator 10 is used with an engine or motor (not shown) having a drive shaft (not shown), it is preferable that the engine remain substantially aligned with the drive shaft at all times. Alignment of the engine with the drive shaft may be achieved upon installation of the vibration isolator or isolators 10 via the attachment member 30 or via shims (not shown) placed underneath the base 14 of the individual isolators 10.

Alignment of the engine may also be necessary when the stiffness of the flexible member 18 is adjusted. As the member 18 becomes more flexible, the curvature of the flexible member 18 increases (due to the weight of the engine or motor), thus increasing the vertical displacement of the flexible member 18. As the member 18 becomes less flexible, the curvature of the flexible member 18 decreases, thus decreasing the vertical displacement of the flexible member 18. In order to maintain the alignment of the engine and drive shaft when the stiffness of the flexible member 18 is adjusted, the height of the supports 16 (with respect to the bottom of the base 14) is increased as the supports 16 are moved outward along the base 14. The height of the supports 16 is adjusted such that the attachment position 28 of the flexible member 18 remains substantially constant as the supports 16 move along the length of the flexible member 18.

In the first and second preferred embodiments illustrated in FIGS. 1–5 and FIGS. 6, 6A, and 7, the path of the supports 16 along the base 14 is curved such that the height of the supports 16 (with respect to the bottom of the base 14) is increased as the supports 16 are moved away from the attachment position 28. In order to allow for vertical movement of the supports 16, the shaft 42 is positioned in slots 56 (illustrated in phantom in FIG. 6) in the end stops 34 that allow for vertical movement of the shaft 42. In addition, each support 16 is connected to the shaft 42 by mating threads on a cylindrical casing (not shown) that is pivotally mounted to the support 16. When the supports 16 move outward along the shaft 42, the supports 16 follow the path of the curved base 14. As the vertical height of the supports 16 increases along the base 14, the vertical height of the shaft 42 also increases within the slots 56 in the end stops 34. As the supports 16 move apart along the base 14, the angle of the supports 16 with respect to the bottom of the base 14 decreases. The casings pivot in the supports 16 to maintain threaded contact with the shaft 42 as the angle of the supports 16 changes with respect to the bottom of the base 14.

In systems requiring the maintanance of close alignment between the engine and the drive shaft or drive train, multiple vibration isolators 10 are preferably used. The multiple vibration isolators 10 are preferably positioned equidistant from an axis of the drive shaft and are preferably coplanar with each other. This arrangement ensures that any torque transmitted to the drive shaft results in rotation of the drive shaft about the axis of the drive shaft and does not result in lateral motion of the drive shaft.

Figure 13:
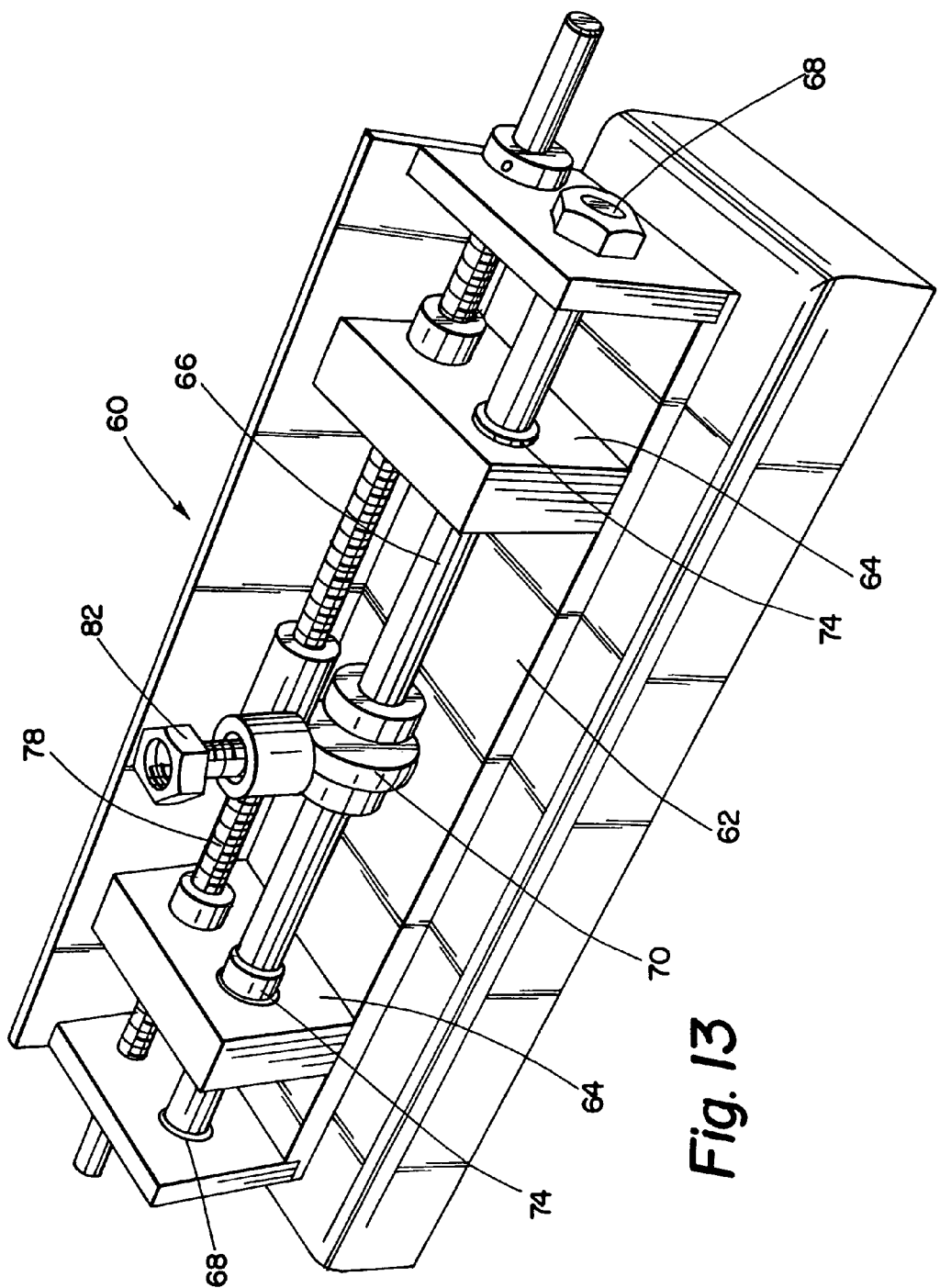
FIG. 13 is a perspective view of a vibration isolator according to another preferred embodiment of the invention for isolating vibration perpendicular to the axis of the flexible element while maintaining a rigid restraint parallel to that axis.

The vibration isolator of the present invention also may isolate vibration perpendicular to the axis of flexible element while maintaining a rigid restraint parallel to the elongate axis. Such a vibration isolator provides rotational and transation isolation for a marine engine while rigidly supporting propeller shaft thrust. Other applications for such a vibration isolator will be apparent to those skilled in the art given the benefit of this disclosure. Turning now to FIG. 13, the vibration isolator 60 includes a base 62, two supports 64 connected to the base 62, and a flexible member 66 supported by the two supports 64. As described above, at least one of the supports 64 is slidably connected to the base 62. Preferably, both supports 64 are slidably connected to the base 62.

The flexible member 66 is a tubular or solid element having a cross-section of circular or elliptical shape and an elongate length. In a particularly preferred embodiment, the flexible member 66 is formed from a pultruded fiberglass rod, although other compatible flexible materials also may be used. Wear surfaces 68, which may be threaded phosphor bronze elements or other wear reducing material, may be provided on the ends of the flexible member 66. The wear surface elements 68 constrain the flexible member 66 longitudinally within the supports 64. At least one of the wear surface elements 68 may be adjustable so there is little "end play" of the flexible member 66.

Figure 14:
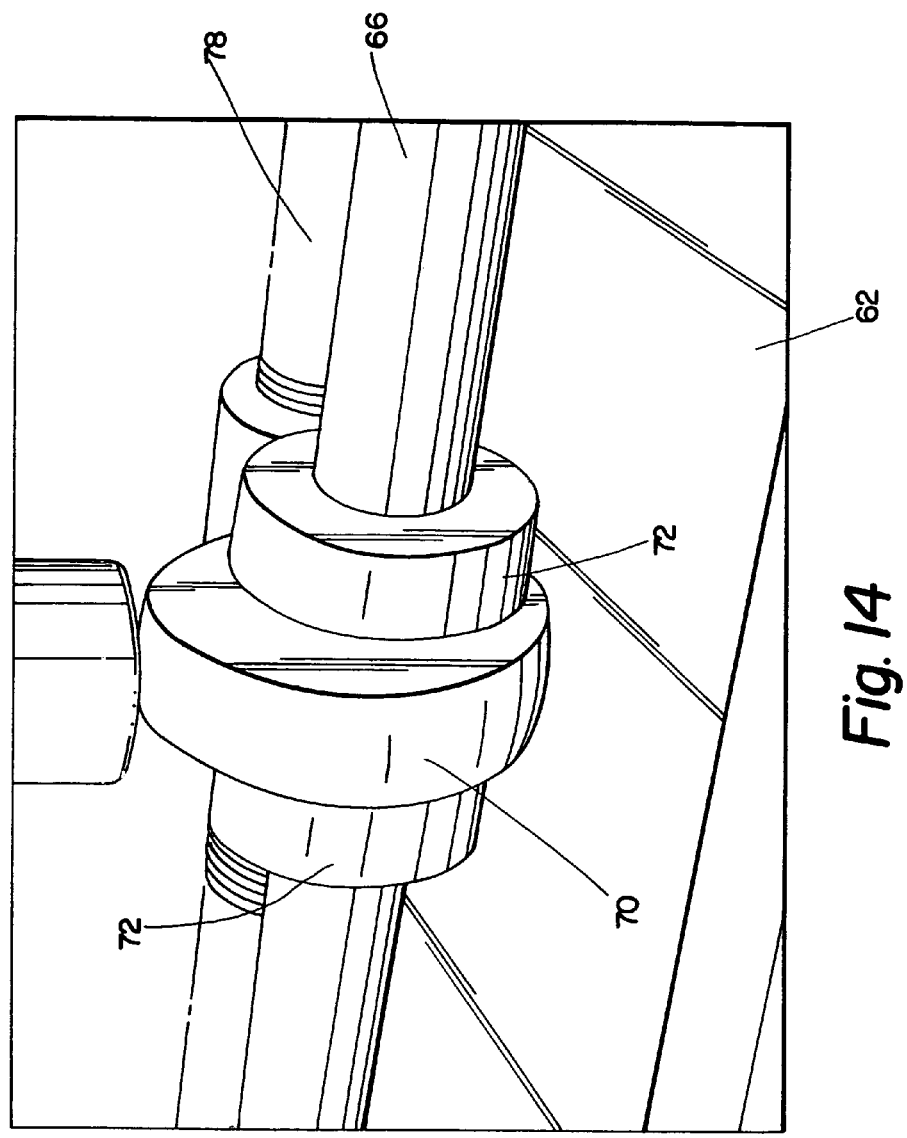
FIG. 14 is a detail view of a spherical bearing used to connect the flexible member of the vibration isolator of FIG. 13 to a support for a vibration source.

The flexible member 66 is attachable to a vibration source, preferably by a spherical collared bearing 70, best shown in FIG. 14. The bearing 70 is secured to the flexible member 66 by two clamp collars 72 to avoid movement of the bearing 70 and its vibration source attachment point 82 along the axis of the flexible rod 66. The spherical bearing 70 may be permanently lubricated, for example, by bonding a layer of a friction-resistant material, such as Teflon, to the inside of the outer race of the spherical bearing 70. The rotational orientation of the shaft of the rod end is maintained by its rigid attachment to the vibration source. The clamp collars 72 securing the bearing 70 to the flexible rod 62 and the threaded wear surface elements 68 cooperate to maintained the vibration source in its preferred position in the center of the isolator 60 between the supports 64.

Figure 15:
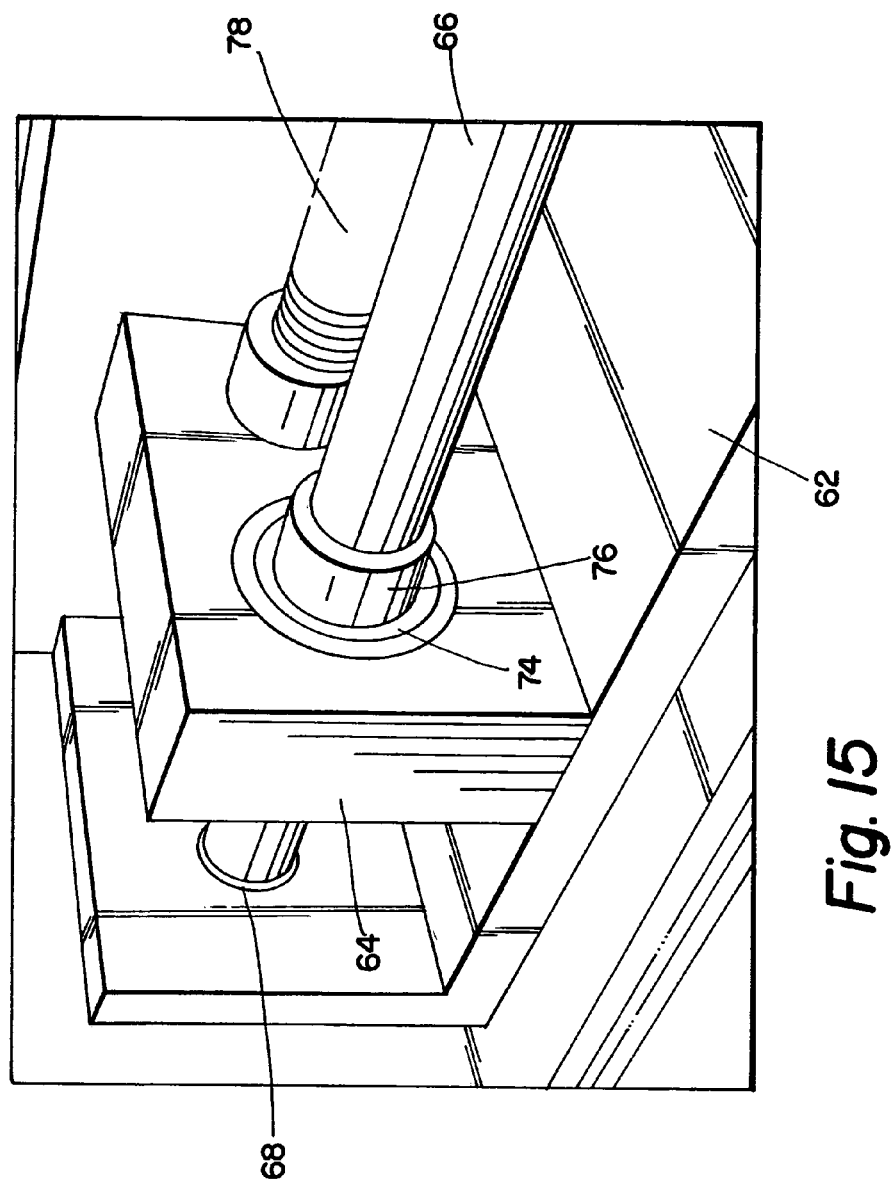
FIG. 15 is a detail view of a spherical bearing and sleeve used to connect the flexible member to a support in the isolator of FIG. 13.

Each support 64 slidably engages the flexible member 66 such that the flexible member 66 can move relative to each support 64, with the support 64 that is slidably connected to the base 62 being moveable along the elongate length of the flexible member 66. The flexible member 66 is supported on the supports 64 by hybrid spherical/sliding bearings 74 pressed into the supports 64, as shown in FIGS. 13 and 15.

The hybrid spherical/sliding bearing 74 includes a sleeve 76 pressed into the spherical bearing 74. Preferably, a sintered phosphor bronze sleeve is used. The sleeve 76 is sized to slide on the flexible member 66 with almost no lateral play. The spherical bearing component of the hybrid bearing 74 may be permanently lubricated as described above.

The sleeve 76 allows sliding contact between the flexible member 66 and the support 64 along the elongate axis of the flexible member 66. The sleeve 76 also functions as a cylindrical stop to restrain the flexible member 66 from displacement in any direction radial to the elongate axis. The hybrid bearing 74 allows the flexible member 66 to slide within the sleeve 76 in the direction of its elongate axis and to bend without restraint in an angle from its elongate axis but does not allow displacement of the flexible member 66 in any direction radial to the elongate axis.

The vibration isolator 60 also includes means for moving the supports 64. The moving means may comprises a shaft 78 operatively connected to the supports 64 and positioned along a rotational axis about which the shaft 78 is rotatable. As described above, the shaft 78 has a set of first threads on a first half of the shaft and a second set of threads on a second half of the shaft. The first set of threads mate with corresponding threads on one of the supports and the second set of threads mate with corresponding threads on the other of the supports. The first set of threads is oriented in a first direction and the second set of threads is oriented in an opposite direction such that the supports move in opposite directions at equal rates when the shaft is rotated about the rotational axis. As described above, other means for moving the supports 64 along the elongate length of the flexible member 66 (such as, for example, a piezoelectric actuator system, a hydraulic system, a system of racks on a common pinion, a cam bearing system, or other mechanical systems such as linkages or cables) are also included in the invention.

Figure 16:
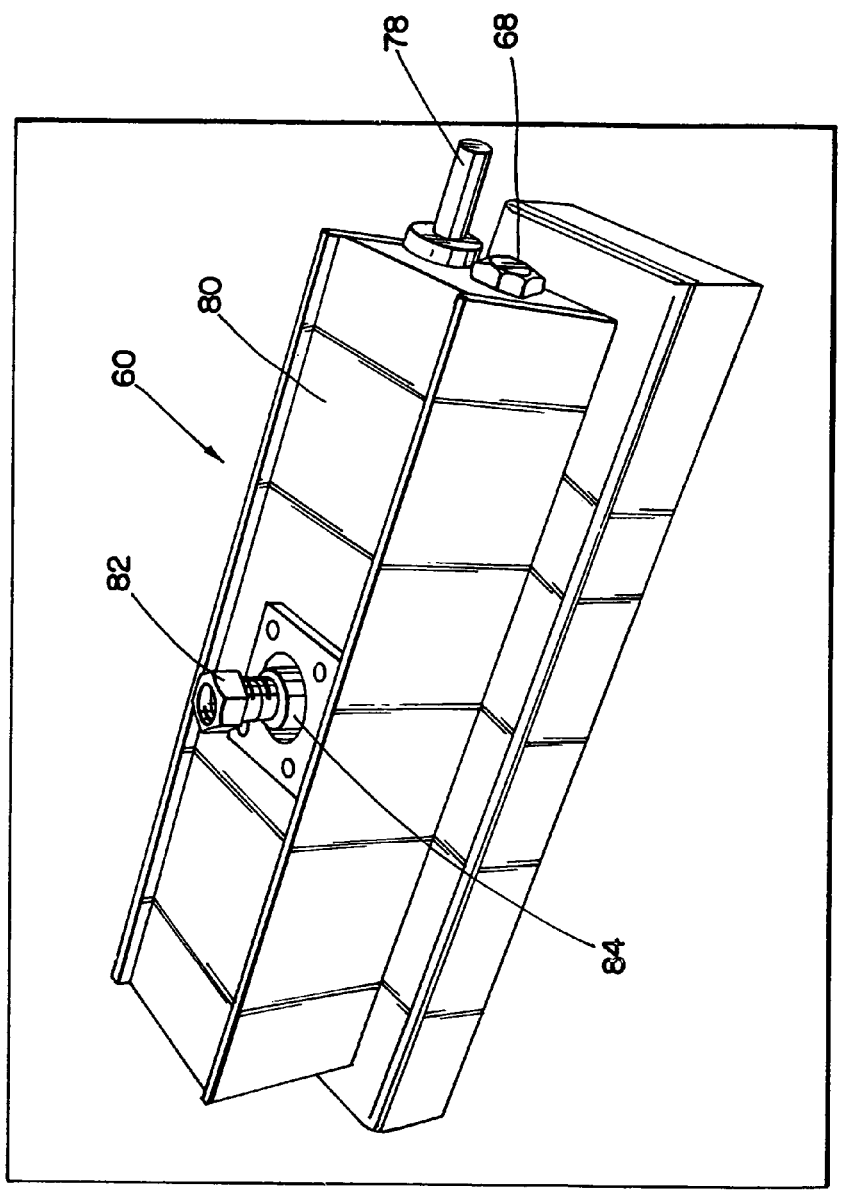
FIG. 16 is a perspective view of the vibration isolator of FIG. 13 enclosed in a casing, with the support attachment point penetrating through a membrane provided in the casing.
Figure 16A:
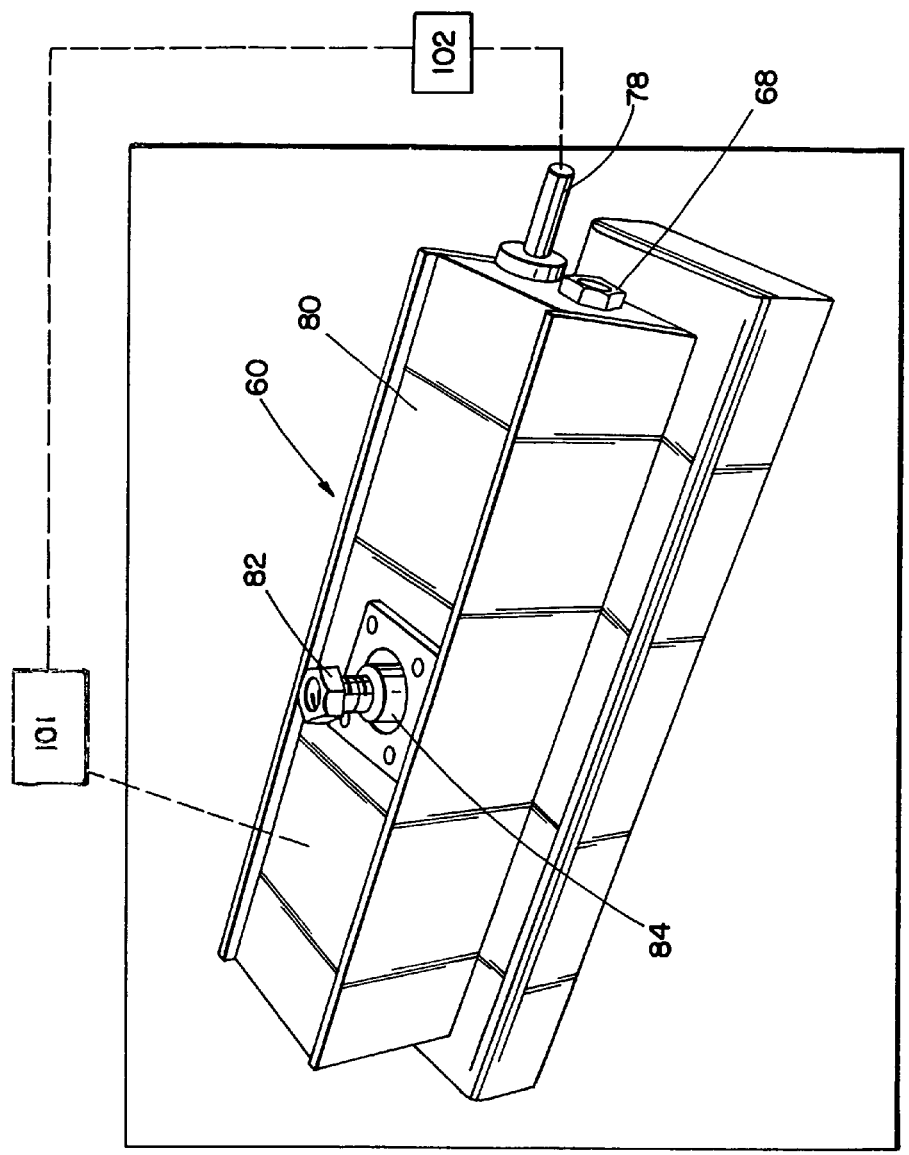
FIG. 16A is a schematic diagrammatic view of the vibration isolator of FIG. 16, showing a computerized control system for automating the moving means.
Figure 17:
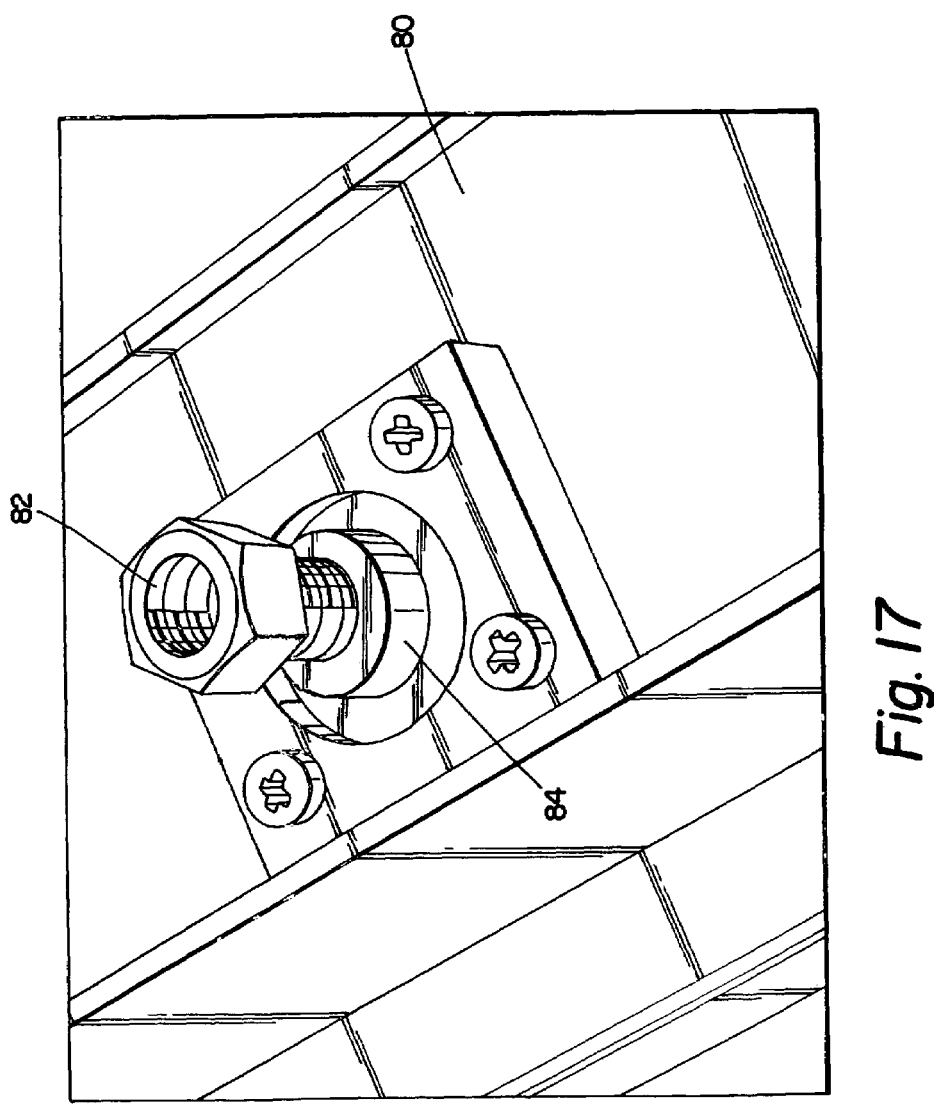
FIG. 17 is a detail view of the membrane of FIG. 16.

The vibration isolator 60 may also be provided with a casing or cover 80 (shown in FIG. 16). The casing 80 may protect the isolator 60 from dirt and other elements present in particular use environments. The support attachment point 82 of the spherical bearing 70 may project through a membrane 84 provided in the casing 80 (best shown in FIG. 17), which may be formed from a flexible material resistant to a particular use environment, such as neoprene rubber for marine environments. The support attachment point 82 rigidly connects the bearing 70 to the vibration source. The membrane 84 provides a seal around the moving support attachment 82 and holds the support attachment 82 in position during assembly on a vibration source. The ends of the rotary adjustment shaft 78 and the end play adjustment (adjustable wear surface element) 68 of the flexible member 66 also may project through the casing 80, as shown in FIG. 16. Other embodiments of the invention also may include a casing to protect the isolator from dirt and other elements present in particular use environments.

In another embodiment of the present invention, a vibration isolator is provided for use in a system with an isolated surface and a vibrating substrate. The vibration isolator comprises a base in communication with the vibrating substrate, two supports slidably connected to the base, a flexible member supported by the two supports, and a surface attached to the flexible member. The flexible member has a generally elongate shape and an elongate length. Each support slidably engages the flexible member such that each support is movable along the elongate length of the flexible member.

A vibration isolator for use in a system with an isolated surface and a vibrating substrate, not shown in the drawings, may have a structure similar to that shown in FIGS. 1–5. The system comprises a base 14' in communication with the vibrating substrate, two supports 16' connected to the base 14', a flexible member 18' supported by the two supports 16', and a surface 18A attached to the flexible member 18'. At least one of the supports 16' is slidably connected to the base 14'. The flexible member 18' has a generally elongate shape and an elongate length including a midportion and opposing ends. The flexible member 18' is supported by the two supports 16' at a distance spaced from the corresponding ends of the flexible member 18'. The surface 18A is connected to the flexible member 18' intermediate the ends of the flexible member and between the two supports 16', preferably in the area of attachment position 28.

The surface 18A may be a provided as a separate element or formed integrally with the flexible member 18'. The surface 18A may be adapted for performing an operation that benefits from a reduction in vibration transmitted from a vibrating substrate and may take the form and be constructed of materials compatible with that operation. The surface 18A may, for example, take the form of a generally planar member or an enclosure, including but not limited to a reaction vessel.

The flexible member 18' is capable of bending from an original position to assume a more or less bowed position in response to changes in a load applied to the surface 18A. The flexible member 18' and the supports 16' cooperate to allow oscillation of the flexible member 18' at a predetermined frequency in response to vibration transmitted from the substrate through the supports 16'. The sliding movement of at least one of the supports 16' relative to the other support 16' alters the predetermined frequency at which the flexible member 18' responds to the transmitted vibration.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to use the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A vibration isolator for use in a system with a vibration source and a support structure for the vibration source, the vibration isolator comprising:
    a base in engagement with the support structure, the base having a surface that curves upwardly from a central portion of the base toward opposing ends of the base;
    two supports slidably connected to the base; and
    a flexible member having a generally elongate shape and an elongate length and being attachable to the vibration source at an attachment position centrally located along the elongate length of the flexible member, the flexible member being supported by the two supports positioned on opposite sides of the attachment position;
    wherein each support slidably engages the flexible member such that each support is movable along the elongate length of the flexible member and is movable along the curved surface of the base such that the vertical distance between the flexible member engaging portion of the supports and the central portion of the base is increased as each support is longitudinally moved away from the opposing support.

2. The vibration isolator of claim 1, wherein the supports are positioned at substantially equal distances from the attachment position of the flexible member.

3. A vibration isolator of claim 2, wherein the supports are concurrently movable in opposite directions along the flexible member such that the supports remain at substantially equal distances from the attachment position of the flexible member when the supports are moved.

4. A vibration isolator for use in a system with a vibration source and a support structure for the vibration source, the vibration isolator comprising:
    a base in engagement with the support structure, the base having a surface that curves upwardly from a central portion of the base toward opposing ends of the base;
    two supports each having a base-engaging end slidably attached to the base and an opposing end for engaging a flexible member; and
    a flexible member having a generally elongate shape, an elongate length, and an attachment position for attaching the vibration source, the flexible member defining a first longitudinal axis when the member is in a rest position, the flexible member being supported on the opposing support ends;
    wherein the opposing support ends engage the flexible member such that each support is slidably movable along the elongate length of the flexible member and is slidably movable along the curved surface of the base such that the vertical distance between the flexible member engaging portion of the supports and the central portion of the base is increased as each support is longitudinally moved away from the opposing support.

5. The vibration isolator of claim 4, wherein the supports are concurrently movable in opposite directions along the flexible member.

6. The vibration isolator of claim 4, wherein the attachment position is centrally located along the elongate length of the member and between the two supports.

7. The vibration isolator of claim 4, further comprising means for moving the supports along the elongate length of the flexible member.

8. The vibration isolator of claim 4, further comprising lateral stops to prevent lateral and vertical movement of the flexible member in directions perpendicular to the first longitudinal axis.

9. The vibration isolator of claim 7, wherein the means for moving the supports is selected from a piezoelectric actuator system, a hydraulic system, a rack and pinion system, a cam bearing system, a mechanical linkage system, and a cable system.

10. The vibration isolator of claim 7, wherein the means for moving the supports is automated to respond to vibration occurring in the system in order to optimize the vibration isolation of the vibration isolator.

11. A vibration isolator for use in a system with a vibration source and a support structure for the vibration source, the vibration isolator comprising:
    a base in engagement with the support structure, the base having a surface that curves upwardly from a central portion of the base toward opposing ends of the base;
    two supports slidably connected to the base;
    a flexible member supported by the two supports, the member having a generally elongate shape and an elongate length, the member defining a first longitudinal axis when the member is in a rest position, the member being attachable to a vibration source at an attachment position centrally located along the elongate length of the member, the supports being positioned on opposite sides of the attachment position of the flexible member at substantially equal distances from the attachment position;
    means for moving the supports;
    two end stops attached to the base at positions adjacent the ends of the flexible member to limit the movement of the flexible member in a direction parallel to the first longitudinal axis; and
    lateral stops to prevent lateral movement of the flexible member in a direction perpendicular to the first longitudinal axis;
    each support slidably engaging the flexible member such that each support is movable along the elongate length of the flexible member, the supports sliding along the curved surface of the base such that the vertical distance between the flexible member engaging portion of the supports and the central portion of the base is increased as the supports are moved along the base away from each other.

12. A vibration isolator for use in a system with a vibration source and a support structure for the vibration source, the vibration isolator comprising:
    a base in engagement with the support structure, the base having a surface that curves upwardly from a central portion of the base toward opposing ends of the base;
    two opposing supports connected to the base; and a flexible member having a generally elongate shape and an elongate length, the flexible member being supported on the supports such that at least one support is movable along the elongate length of the flexible member, the flexible member being attachable to a vibration source at an attachment position centrally located along the elongate length and between the supports, the flexible member being capable of oscillating at a frequency that varies with the longitudinal distance between the supports, the flexible member slidably engaging the supports in response to the vibration of a vibration source attached to the flexible member;

the supports being longitudinally moveable along the curved surface of the base such that the vertical distance between the flexible member engaging portion of the supports and the central portion of the base is increased as each support is longitudinally moved away from the opposing support, at least one support being moveable along the curved surface of the base while the flexible member is under load.

13. A method of isolating a vibration source from a support structure, the method comprising the steps of:

providing a base in engagement with the support structure, the base having a surface that curves upwardly from a central portion of the base toward opposing ends of the base;

providing two opposing supports connected to the base, each support being longitudinally moveable along the base relative to the opposing support; and providing a flexible member having a generally elongate shape and an elongate length;

supporting the flexible member on the supports such that at least one support is movable along the elongate length of the flexible member;

attaching the vibration source to the flexible member at an attachment position centrally located along the elongate length and between the supports;

causing the vibration source to vibrate, the flexible member oscillating at a frequency that varies with the longitudinal distance between the supports and slidably engaging the supports in response to the vibration of the source;

longitudinally moving the supports along the curved surface such that the vertical distance between the flexible member engaging portion of the supports and the central portion of the base is increased as each support is longitudinally moved away from the opposing support; and longitudinally moving at least one support while the flexible member is under load, the movement changing the position at which the at least one support engages the flexible member, the position change altering the frequency at which the flexible member oscillates in response to the vibration of the source.

14. A method of continuously adjusting the frequency response of a vibration isolator in a system with a vibration source and a support structure for the vibration source, the method comprising the steps of:

providing a base in engagement with the support structure, the base having a surface that curves upwardly from a central portion of the base toward opposing ends of the base;

providing two opposing supports connected to the base, the supports being longitudinally moveable along the base relative to the opposing support; and providing a flexible member having a generally elongate shape and an elongate length;

supporting the flexible member on the supports such that at least one support is movable along the elongate length of the flexible member;

attaching the vibration source to the flexible member at an attachment position centrally located along the elongate length and between the supports;

causing the vibration source to vibrate, the flexible member oscillating at a predetermined frequency and slidably engaging the supports in response to the vibration of the source;

moving the supports along the curved surface such that the vertical distance between the flexible member engaging portion of the supports and the central portion of the base is increased as each support is longitudinally moved away from the opposing support; and longitudinally moving at least one support while the flexible member is under load, the movement changing the position at which the at least one support engages the flexible member, the position change altering the frequency at which the flexible member oscillates in response to the vibration of the source.

15. A vibration isolator for use in a system with a vibration source and a support structure for the vibration source, the vibration isolator comprising:

a base in engagement with the support structure, the base having a surface that curves upwardly from a central portion of the base toward opposing ends of the base;

two supports slidably connected to the base;

a flexible member supported by the two supports, the member having a generally elongate shape and an elongate length, the member defining a first longitudinal axis when the member is in a rest position, the member being attachable to a vibration source at an attachment position centrally located along the elongate length of the member;

means for moving the supports along the curved surface of the base such that the vertical distance between the flexible member engaging portion of the supports and the central portion of the base is increased as each support is longitudinally moved away from the opposing support;

two end stops attached to the base at positions adjacent the ends of the flexible member to limit the movement of the flexible member in a direction parallel to the first longitudinal axis; and lateral stops to prevent lateral movement of the flexible member in a direction perpendicular to the first longitudinal axis;

wherein each support slidably engages the flexible member such that each support is movable along the elongate length of the flexible member and wherein the supports are positioned on opposite sides of the attachment position of the flexible member at substantially equal distances from the attachment position of the flexible member.

16. A vibration isolator for use in a system with a vibration source and a support structure for the vibration source, the vibration isolator comprising:

a base in engagement with the support structure, the base has a surface that curves upwardly from a central portion of the base toward opposing ends of the base;

two supports slidably connected to the base;

a flexible member supported by the two supports, the member being attachable to the vibration source and having a generally elongate shape and an elongate length, the member defining a first longitudinal access when the member is in a rest position; and two end stops attached to the base at positions adjacent the ends of the flexible member to limit horizontal movement of the flexible member in directions parallel to the first longitudinal axis;

each support slidably engaging the flexible member such that each support is movable along the elongate length of the flexible member, the supports sliding along the curved surface of the base such that the vertical distance between the flexible member engaging portion of the supports and the central portion of the base is increased as each support is longitudinally moved away from the opposing support.

17. A vibration isolator for use in a system with a vibration source and a support structure for the vibration source, the vibration isolator comprising:

a base in engagement with the support structure, the base having a surface that curves upwardly from a central portion of the base toward opposing ends of the base;

two supports slidably connected to the base;

a flexible member supported by the two supports, the member being attachable to the vibration source and having a generally elongate shape and an elongate length; and means for moving the supports along the elongate length of the flexible member, the means for moving the supports comprising a shaft operatively connected to the supports and positioned along a rotational axis about which the shaft is rotatable, the shaft having a set of first threads on a first half of the shaft and a second set of threads on a second half of the shaft, the first set of threads mating with corresponding threads on one of the supports and the second set of threads mating with corresponding threads on the other of the supports, the first set of threads oriented in a first direction and the second set of threads oriented in an opposite direction such that the supports move in opposite directions at equal rates when the shaft is rotated about the rotational axis;

wherein each support slidably engages the flexible member such that each support is movable along the elongate length of the flexible member, the supports sliding along the curved surface of the base such that the vertical distance between the flexible member engaging portion of the supports and the central portion of the base is increased as each support is longitudinally moved away from the opposing support.

18. A vibration isolator for use in a system with an isolated surface and a vibrating substrate, the vibration isolator comprising:

a base in communication with the vibrating substrate, the base having a surface that curves upwardly from a central portion of the base toward opposing ends of the base;

two supports each having a base-engaging end slidably attached to the base and an opposing end for engaging a flexible member;

a flexible member having a generally elongate shape and an elongate length, the flexible member being supported on the opposing ends of the two supports, and a surface attached to the flexible member;

wherein the opposing end of each support engages the flexible member such that each support is slidably movable along the elongate length of the flexible member, the supports sliding along the curved surface of the base such that the vertical distance between the flexible member engaging end of the supports and the central portion of the base is increased as each support is longitudinally moved away from the opposing support.

19. A vibration isolator for use in a system with a vibration source and a support structure for the vibration source, the vibration isolator comprising:

a base in engagement with the support structure, the base having a surface that curves upwardly from a central portion of the base toward opposing ends of the base;

two supports slidably connected to the base;

a flexible member supported by the two supports, the member being attachable to the vibration source and having a generally elongate shape and an elongate length, the member defining a first longitudinal axis when the member is in a rest position; and a cylindrical stop to prevent displacement of the flexible member in a direction radial to the first longitudinal axis without limiting displacement of the flexible member in directions parallel to the first longitudinal axis or bending of the flexible member in directions angular to the first longitudinal axis;

wherein each support slidably engages the flexible member such that each support is movable along the elongate length of the flexible member, the supports sliding along the curved surface such that the vertical distance between the flexible member engaging portion of the supports and the central portion of the base is increased as the supports are moved along the base away from each other.

20. The vibration isolator of claim 19, further comprising means for moving the supports comprising:

a shaft operatively connected to the supports and positioned along a rotational axis about which the shaft is rotatable, the shaft having a set of first threads on a first half of the shaft and a second set of threads on a second half of the shaft, the first set of threads mating with corresponding threads on one of the supports and the second set of threads mating with corresponding threads on the other of the supports, the first set of threads oriented in a first direction and the second set of threads oriented in an opposite direction such that the supports move in opposite directions at equal rates when the shaft is rotated about the rotational axis.

* * * * *